April 14, 1953 R. CHAPPELL 2,634,767
PORTABLE ELECTRIC HANDSAW GUIDEWAY
Filed Jan. 30, 1951
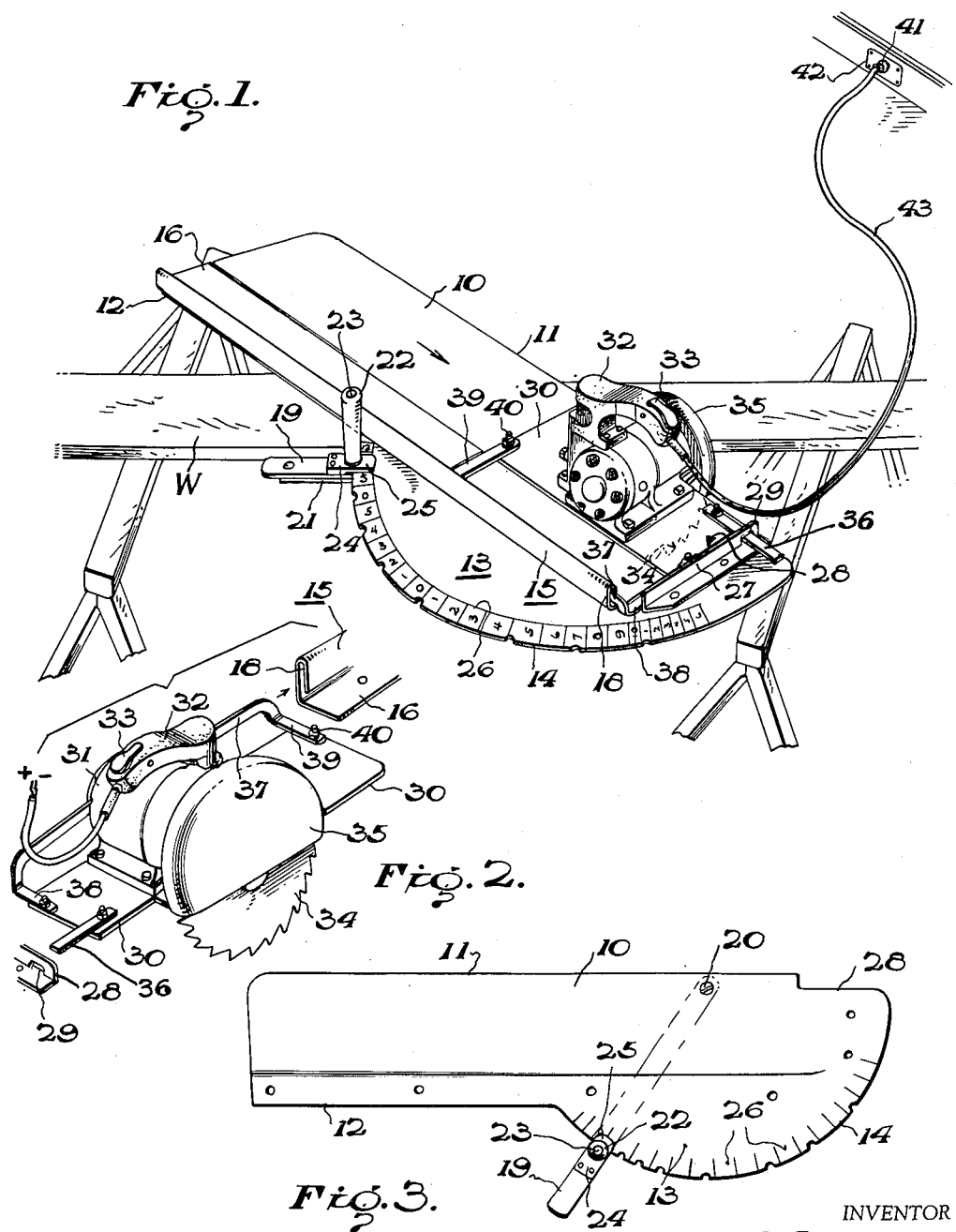
INVENTOR
*Richard Chappell.*
BY
ATTORNEY Patented Apr. 14, 1953

2,634,767

UNITED STATES PATENT OFFICE 2,634,767

PORTABLE ELECTRIC HANDSAW GUIDEWAY

Richard Chappell, Fort Benton, Mont.

Application January 30, 1951, Serial No. 208,475

2 Claims. (Cl. 143—6)

The present invention relates to a portable hand saw guide for use with substantially all standard type portable electric hand saws.

An object of the invention is to provide a saw guide for standard type portable electric rotary hand saws adapted to be laid upon the work to be sawed and set at any desired angle, to thereby guide the saw across the work at any desired cutting angle.

Another object is to provide a saw guide for a portable hand saw which is very efficient and accurate as it prevents any movement in lateral directions during the longitudinal travel of the saw along the guide.

A further object is to provide a portable saw guide as an article of manufacture formed of a minimum number of parts to provide for economy of manufacture, simplicity in operation and great durability.

With these and other objects in view, the present invention consists in the construction, arrangement and combination of parts hereinafter described and particularly pointed out in the claims, it being understood that I do not intend to limit myself to the details of construction.

In the drawings, like numerals are employed to designate like parts throughout the same.

Figure 1 is a top perspective view of the present invention, saw guide, with a saw mounted thereon positioned for a start of the sawing operation adjacent a work piece supported on a pair of saw horses.

Figure 2 is a perspective view of a saw, an end of the saw guiding fence and the transverse saw cut squaring bar.

Figure 3 is a top plan view of the saw guide base plate or table with the saw, the guiding fence and the transverse squaring bar removed.

Referring to the drawing and first with particular reference to Figure 1, the present invention comprises an elongated table or plate 10 formed along one side with a straight longitudinal edge 11 and formed along the opposite longitudinal edge 12 with a protractor 13. The protractor 13 comprises a segment with a curved peripheral edge 14. The protractor segment is formed by stamping or cutting it out as an integral part of the plate 10 and its peripheral edge curves from one transverse end edge in an arc to a point intermediate the plate 10 on the longitudinal edge 12. From this point the edge 12 of the plate 10 continues in a straight line parallel to the opposite edge 11.

Mounted in alignment with longitudinal edge 12 on the surface of the table or plate 10 is a novel saw guiding fence 15, formed with a base 16, which is secured to the plate 10 by rivets or the like and an upstanding inverted guide loop 18, see Figure 2. The loop 18 is formed from the material constituting the guiding fence 15 by simply doubling over downwardly the upstanding part of the fence to a distance just above the base plate 10.

The protractor 13 coacts with a work engaging gage bar 19 pivoted to the underside of the plate 10 at the center point with respect to the circumferential or peripheral edge of the protractor segment.

The pivotal point of the work-engaging gage bar 19 comprises a pivot bolt 20 mounted in a countersunk bearing surface formed from the plate 10, and it is adapted to swing to different radial positions with respect to the edge 14 of the protractor 13. The protractor edge is notched at spaced apart intervals. The gage bar 19 has a depending flange 21 which engages against the work W to be cut or sawed, see Figure 1.

Carried by the upper surface of the work gage bar 19 is an upstanding handle 22 mounted on a bolt 23. Also secured to the gage bar 19 is a plate 24 formed with a tongue 25 which overlaps the surface edge of the protractor. This tongue 25 is formed with an aperture for the handle bolt 23 to extend through and serves to assist in supporting the gage bar 19 to different adjusted positions over the protractor scale 26. The exterior half of the circumference of the bolt 23 fits in each notch on the protractor's edge as the gage bar is adjusted.

One end of the saw fence 15 terminates near the curved protractor end of the plate 10, and transverse the plate 10 at this end is an angle iron saw squaring bar 27. This angle iron bar 27 is formed with an opening 29 and the bar extends transversely at right angles from an edge 28 cut back with respect to the longitudinal edge 11 of plate 10, see Figure 3. The inner surface of bar 27 serves as a square to position the squared end of a saw carriage base 30 and the saw 34 parallel to the edge 11 of the saw table 10.

Any standard rotary hand saw may be mounted for use on the table 10 and as shown in Figure 2 such saws include the usual carriage base 30 on which is mounted an electric motor 31 with operating handle 32 and a switch control 33. The saw 34 is driven from the armature shaft of the motor and extends downward vertically below the base 30 from within the hood guard 35.

In prior structures the saw fence or longitudinal saw guide has no provision for prevention of lateral movement of the saw during operation or for initially squaring the saw at the starting position. However, with my invention lateral movement is prevented by the novel construction of the fence or saw guide 15, which has the loop 18 for this purpose in combination with a guide yoke 37 vertical with respect to the saw base 39 and squaring is provided by means of the angle bar 27 arranged to square against the transverse squared rear edge of the saw base 30, see Figure 2.

The saw base 30 has a pilot positioning bar 36 adapted to project through the angle bar 27 in opening 29 after the saw carriage has been retracted along the plate 10 to starting position.

The saw guide yoke 37 is formed with apertured right angled feet 38 and 39 at each end, which serve to secure the yoke to the upper surface of the saw base 30 with the nut and bolts 40.

Operation

From the foregoing description, the use of the device should be apparent. For example, the gage bar 19 is set to any desired cutting angle on the protractor scale 26, the saw carriage with the guide yoke 37 sliding in the guide loop 18 is retracted against the square bar 27. Then the saw table 10 is rested on a piece of work with the flange 21 of the gage bar 19 engaging the edge of the work, as shown in Figure 1.

The electric saw motor power jack 41 on cable 43 is plugged into a power outlet 42 or the like and the circuit is completed when desired by the switch 33. As the motor is energized and the saw blade 34 is rotated, the operator simply pushes the saw carriage forward and the guide fence 15 maintains and secures the saw in a straight line free from lateral displacements to the end of the table 10.

The work may be supported in any suitable manner and as illustrated in Figure 1 simple saw horses are used.

It will thus be seen that there is provided a device in which the several objects of the invention are achieved, and which is well adapted to meet the conditions of practical use.

I claim:

1. A saw guide comprising an elongated plate carried by a saw with a carriage base slidable thereover, said plate having a longitudinal edge along which the saw blade travels and having a second longitudinal edge formed with a guide loop, said loop slidably embracing a guide yoke carried by the saw carriage base, whereby said guide plate, said guide loop and said loop embraced saw carried guide yoke may be handled together as one unit and a stop member transverse an end of said guide plate adapted to maintain the said guide loop in saw guide yoke embracing position at the end of the guide plate and serving as a squared starting point for the saw, said stop member being formed with an opening adapted to receive a bar carried by the said saw carriage base when the saw is in retracted position at the end of the guide plate.

2. A saw guide comprising an elongated plate carried by a saw with a carriage base slidable thereover, said plate having a longitudinal edge along which the saw blade travels and having a second longitudinal edge formed with a guide loop, said loop slidably embracing a guide yoke carried by the saw carriage base, whereby said guide plate, said guide loop and said loop embraced saw carried guide yoke may be handled together as one unit and a stop member transverse an end of said guide plate adapted to maintain the said guide loop in saw guide yoke embracing position at the end of the guide plate and serving as a squared starting point for the saw and a protractor and gauge bar carried by said guide plate for angularly positioning the saw carried guide plate with respect to the work to be sawed.

RICHARD CHAPPELL.

References Cited in the file of this patent

UNITED STATES PATENTS

| Number | Name | Date |
|---|---|---|
| 996,149 | Schuring | June 27, 1911 |
| 1,332,714 | D'Arcy et al. | Mar. 20, 1920 |
| 1,700,189 | Wikstrom | Jan. 29, 1929 |
| 1,960,590 | McKay | May 29, 1934 |
| 2,527,754 | McDermett | Oct. 31, 1950 |